Jan. 22, 1929.
L. E. WOOLF
1,699,730
LICENSE HOLDER
Filed June 7, 1927
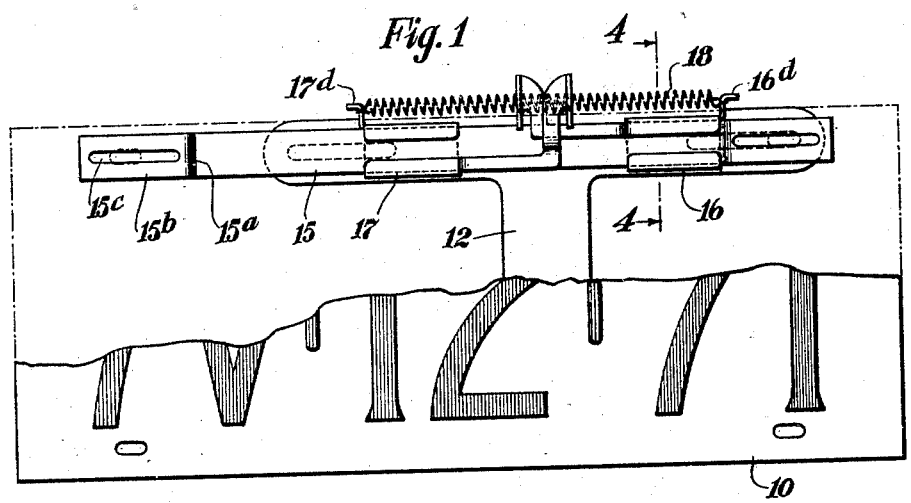
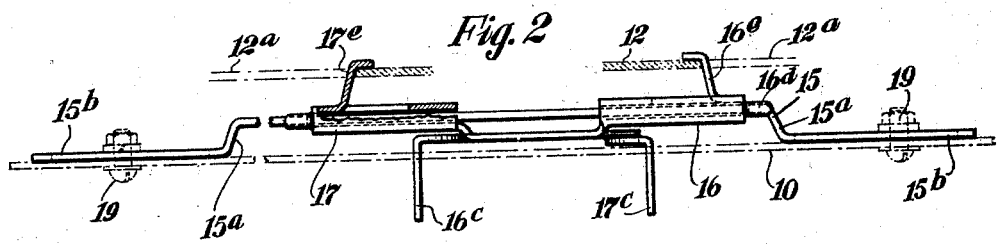
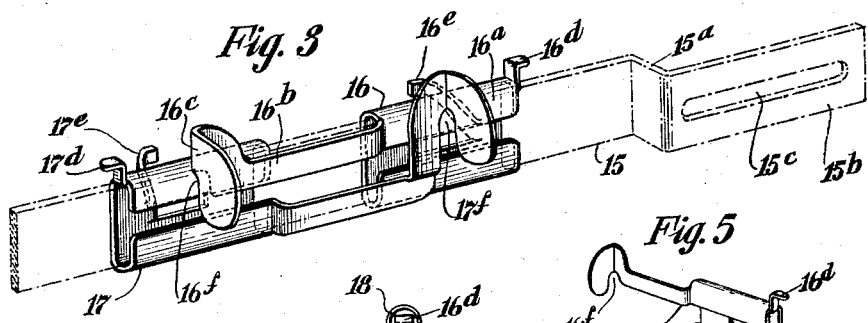
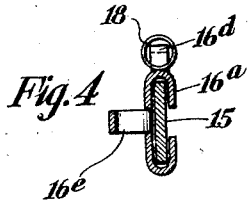
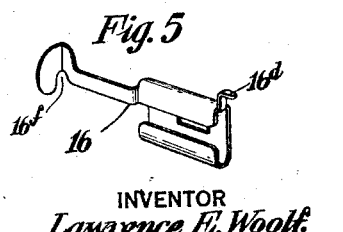
INVENTOR
Lawrence E. Woolf,
BY
Hammond & Littell
ATTORNEYS Patented Jan. 22, 1929.

1,699,730

UNITED STATES PATENT OFFICE.

LAWRENCE E. WOOLF, OF WHITE PLAINS, NEW YORK.

LICENSE HOLDER.

Application filed June 7, 1927. Serial No. 197,039.

This invention relates to improvements in supports for removably attaching license tags to an automobile, and in particular, this application is an improvement on my copending application Serial No. 170,463, filed February 24, 1927.

As is mentioned in that application, under various circumstances in the automotive trade it is quite desirable that license plates or identification tags be demountably supported on the automobile. It is often very necessary that these license plates be removed or quickly replaced, as a vehicle in stock or storage is to be demonstrated on the road thus necessitating the use of the required State license plates.

In the copending application, a particular form was described and in this application an improvement as to details is disclosed. The operation of the license plate holder, however, is substantially the same.

It is an object of this invention to provide a license plate holder which can be permanently secured to the license plate and quickly secured to or removed from the automobile.

It is a further object of this invention to provide a means intermediate the license plate and the usual license plate support on a motor vehicle which means may be positively and permanently secured to the license plate and which may be resiliently retained on the license support.

It is a still further object of this invention to provide a more readily adjustable license plate holder to be secured intermediate the license plate and the license plate holder.

It is a still further object of this invention to provide a license plate holder to be permanently secured to the license plate to prevent loss, which may be resiliently secured to the vehicle support to secure the license plate in a demountable manner and which will permit such adjustment of the license plate as will permit an unobstructed location of the plate.

Further objects and advantages of this invention will appear from the following detailed description of the attached drawings which illustrate a preferred form of embodiment of the invention, and in which:—

Fig. 1 is an elevation of a license plate, attached holder bracket and vehicle support, certain parts being broken away to more clearly illustrate the adaptation of my invention thereto.

Fig. 2 is a plan view of the improved attaching means and license holder bracket, the license holder bracket being in cross section.

Fig. 3 is a perspective view of the license holder bracket, the main bar of which is shown in outline.

Fig. 4 is a vertical section on the line 4—4 of Fig. 1.

Fig. 5 is a perspective view of one of the movable support engaging members.

A license identification tag 10 is commonly required by State governments for the registration and operation of all road vehicles including automobiles, trucks, and tractors. Such conveyances are usually provided with some form of rear license support 12 suitably apertured at $12^a$ to receive the attaching nuts and bolts to secure the license tag thereto. When it is desired to remove the license plate from the support it has been necessary to remove the usually rusted nuts and bolts and, for frequent replacement or removal of a license tag, the time and labor necessary has always been a source of irritation. To provide a simplified means of demountably retaining the license tag on the vehicle which will not become lost from the license plate, I provide a license plate holder generically shown at 14 and comprising the main bar 15 and two support engaging members 16 and 17 which closely embrace and slide on the main bar 15.

Each of these sliding members is the same in shape as shown in Fig. 3 and the description of one will suffice to disclose the invention. The support engaging member 16 is formed of sheet metal which is bent at $16^a$ to form a channel thru which the bar 15 passes. A portion $16^b$ extends laterally along the bar 15 from the portion $16^a$ crossing the corresponding part on the member 17 and acts as an extension for the finger engaging part $16^c$. Upstanding from the portion $16^a$ is a second angular bracket $16^d$, and directly behind the embracing portion $16^a$ is a rearwardly bent support engaging projection $16^e$.

As shown in Fig. 1, corresponding projections or brackets $16^d$ and $17^d$ which are on the extreme ends of their respective slide members 16 and 17 cooperate to receive a tension spring 18 to draw these slide members together. The rearwardly projecting members $16^e$ and $17^e$ cooperate to attach the bracket 14 to the license support 12 and thereby retain the license holder bracket 14 removably secured to the vehicle. The spring 18 will resiliently hold these members 16$^c$ and 17$^c$ in position, and the crossed finger engaging portions 16$^c$ and 17$^c$ will permit the bracket member 16 and 17 to be forced apart by grasping the same between the thumb and fingers of the hand against the tension of the spring 18 to release the rearwardly projecting portions 16$^e$ and 17$^e$ from the support 12. The finger portions 16$^c$ and 17$^c$ are bent from the extension pieces 16$^b$ and 17$^b$ sufficiently far above the outward to leave an adequate space 16$^f$ and 17$^f$ that the license plate 10 will extend unobstructively behind the extended end portions 16$^c$ and 17$^c$, permitting these portions to be grasped outside and in front of the license plate to permit removal or replacement of the plate without requiring the operator to reach behind the license plate.

The main bar 15 as shown in plan view in Fig. 2, is constructed to permit the slide members 16 and 17 to slide relative to each other and to the bar 15 by means of the angularly bent portion 15$^a$ forming the necessary spacing between the license plate 10 and the central portion of the bar 15. The bar 15 is further provided at each end in the face or license plate engaging portion 15$^b$ with an elongated slot 15$^c$ to receive the fastening means illustrated as the nuts and bolts 19 which are adapted to permanently secure the license plate 10 to the bracket 14 in a permanent position.

The outermost ends of the rearwardly projecting support engaging portions 16$^e$ and 17$^e$ which may preferably be stamped from the enclosing part of the slides 16 and 17 are adapted to be bent toward each other in order that a more secure engagement with the vehicle license support may be provided by the clasping action. In view of the fact that frequently the slotted portions 12$^a$ of the support on the vehicle are not always in the same relative position as to other parts of the vehicle such as, for example, the rear fender or the tail light or that there may be objections to permitting the license plate to extend beyond the vehicle side, the members 16 and 17 are slidable relative to the main bar 15 of the license holder and the license may, therefore, be adjusted, relative to the vehicle support, or other parts of the vehicle without changing the action of my securing means.

In Fig. 4 is shown in detail the construction of the embracing portion 16$^a$ forming the channel about the main bar 15, the upstanding projection 16$^d$ receiving the spring 18 and the rearwardly projecting support engaging member 16$^e$.

The operation of the device is as follows:

The license plate is attached to the main bar and is adapted to be permanently retained thereon until a new license plate is issued. This prevents loss of either the license plate of the supporting member and while permitting ready attachment of the license bracket to the vehicle, it does not increase or in any way modify the vehicle construction. To attach the combined license holder and a license to a vehicle, the operator grasps the forwardly projecting portions to force them in a direction toward one another against the spring tension until the rearwardly projecting members are sufficiently displaced to engage in the slots in the usual license support. When the spring is allowed to act to again draw these two slide members to each other, the rearwardly projecting portions will be securely retained to the vehicle support. To remove, the reverse action will take place to permit the rearwardly projecting portions to clear the vehicle support. When the license plate is in position it may be necessary to slide the license plate either to the right or left to clear obstacles or to prevent the license plate from projecting beyond the side of the car. Under such conditions it will be comparatively easy to merely displace the license plate in relation to the secured slide members which will permit the relative movement heretofore mentioned.

From the foregoing description it will be clear that an inexpensive means to be resiliently and detachably placed on the license holder support on the vehicle and permanently on the license tag is provided. By providing the rigid and permanent attachment between the license tag and the holder its loss will not take place and expensive additions and modifications to the vehicle will be unnecessary for quickly attaching and detaching a license tag. The construction may desirably be of sheet metal and stamped and punched into the form shown.

Although a preferred form of embodiment of the invention is shown and described, it is obvious that various modifications may be made therein, and I, therefore, desire protection on the broad scope and purpose of the invention as heretofore described and as claimed in the claims appended thereto.

I claim:—

1. An article of the class described comprising a license plate holder, means for permanently securing the holder to the license plate, said holder comprising a pair of slidable elements resiliently cooperating with a slot in the vehicle support and a bar attached to the license plate on which the sliding elements are retained, to permit the holder to be removably secured to the vehicle support.

2. In a license plate holder for a vehicle, means for permanently securing the holder to a license plate, said holder comprising a main bar permanently attached to the license plate, a pair of slidable members adapted to slide on said main bar and to engage a slot on the vehicle and a resilient means to retain the sliding members in contact with the slot in the vehicle, for removably securing the holder and license to the vehicle.

3. An automobile license plate holder comprising a main bar and longitudinally movable notched supporting members thereon, resilient means for holding said supporting members in engagement with notches in a vehicle license support, and means for permanently securing said bar to a license plate.

4. In combination with a license tag, a supporting member having horizontal slots therein, a bar permanently attached to the license tag, longitudinally movable sleeves on said bar, outwardly bent lugs on said sleeves to be inserted in the slot in the vehicle license supporting member, the lugs on adjacent sleeves being bent toward one another and spring means adapted to draw said lugs toward each other.

5. In combination with a vehicle license supporting bracket, a license plate holder adapted to be permanently attached to a license plate, said holder comprising a pair of support engaging members and a main bar, said bar being slidable in said support engaging members to permit a change in location between said license plate and said support said bar being attached to said plate.

6. As a new article of manufacture, a license holding means to securely hold a license tag to a motor vehicle comprising a main bar angularly bent to form a recess, a pair of sheet metal support engaging members thereon, the said members being provided with crossed finger engaging sections, rearwardly projecting support engaging portions and upwardly extending lugs, a tension spring attached to said lugs to draw the support engaging portions together.

In testimony whereof I have affixed my signature to this specification.

LAWRENCE E. WOOLF.